United States Patent
Ham et al.

(10) Patent No.: US 9,541,384 B2
(45) Date of Patent: Jan. 10, 2017

(54) METHOD AND SYSTEM FOR OPTICAL CAMBER MEASUREMENT OF FLAT SHEET MEMBRANES, FILMS, AND WEBS

(71) Applicant: Celgard, LLC, Charlotte, NC (US)

(72) Inventors: Bogyeol Ham, Waxhaw, NC (US); David P. Bourcier, Ludlow, MA (US); Alan H. Freeman, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 0 days.

(21) Appl. No.: 14/205,849

(22) Filed: Mar. 12, 2014

(65) Prior Publication Data

US 2014/0268175 A1    Sep. 18, 2014

Related U.S. Application Data

(60) Provisional application No. 61/777,683, filed on Mar. 12, 2013.

(51) Int. Cl.
*G01B 11/30* (2006.01)
*G01B 11/245* (2006.01)
*B21B 38/12* (2006.01)

(52) U.S. Cl.
CPC ............ *G01B 11/306* (2013.01); *B21B 38/12* (2013.01); *G01B 11/245* (2013.01)

(58) Field of Classification Search
CPC ..... G01B 11/245; G01B 11/306; G01B 11/24; G01B 11/30; G01B 11/303; B65H 23/0204; B65H 2553/80; B65H 2553/81; B65H 2553/82; B21B 37/68; B21B 38/00; B21B 38/12; B21B 2273/04; B21C 51/00; B21D 43/021; Y10T 83/141; Y10T 83/145

See application file for complete search history.

(56) References Cited

U.S. PATENT DOCUMENTS 3,495,090 A * 2/1970 Revesz ............. G01B 11/2433
                                              250/202
4,149,395 A * 4/1979 Fapiano ................. B21B 37/68
                                              72/11.7
(Continued)

FOREIGN PATENT DOCUMENTS

GB       1466658 A  *  3/1977   ............. G01B 7/287
JP       59016625 A  *  1/1984
(Continued)

OTHER PUBLICATIONS

"Method for Camber Determination on Rolls of Thin Film," Dec. 1991, pp. 400-401, vol. 34, Issue 7A, IBM Technical Disclosure Bulletin, US.*
(Continued)

*Primary Examiner* — Gordon J Stock, Jr.
(74) *Attorney, Agent, or Firm* — Hammer & Associates, P.C.

(57) ABSTRACT

A system, method, and device for measuring camber in a film is disclosed. The system generally includes: a flat surface with a longitudinal axis, at least three sensors spaced apart along the longitudinal axis, and a computing device operatively connected to each sensor. When the film is positioned in relationship to the sensors, the computing device computes the camber of the film. The flat surface may be a table with a film holder. At least one of the sensors may be a LED sensor. The computing device may have an output means, such as a monitor, a printer, or both. The computing device defines a straight line between the first and third sensor based on the position of the film, and the camber is a deviation of the film, measured by the second sensor, from the straight line.

11 Claims, 3 Drawing Sheets

(56) References Cited

U.S. PATENT DOCUMENTS

| | | | | |
|---|---|---|---|---|
| 4,404,634 A | * | 9/1983 | Bautz | B21B 37/68 |
| | | | | 700/150 |
| 4,481,800 A | * | 11/1984 | Ruhl | 72/11.4 |
| 4,528,756 A | * | 7/1985 | Ichihara | 33/503 |
| 4,794,773 A | | 1/1989 | Bradlee | |
| 4,989,164 A | | 1/1991 | Desrousseaux | |
| 5,768,154 A | * | 6/1998 | Zelt et al. | 702/97 |
| 8,929,661 B2 | * | 1/2015 | Thangam et al. | 382/195 |
| 2010/0198552 A1 | * | 8/2010 | Wick et al. | 702/150 |
| 2013/0004080 A1 | * | 1/2013 | Thangam | G06T 7/0004 |
| | | | | 382/195 |

FOREIGN PATENT DOCUMENTS

| | | | | |
|---|---|---|---|---|
| JP | 359016625 A | | 1/1984 | |
| JP | 63235809 A | * | 9/1988 | |
| JP | 01150807 A | * | 6/1989 | |
| JP | 05-157549 A | | 6/1993 | |
| JP | 05155515 A | * | 6/1993 | |
| JP | 05157549 A | * | 6/1993 | |
| JP | 2002-090130 A | | 3/2002 | |
| JP | 2004-177394 A | | 6/2004 | |
| KR | 660224 B1 | * | 12/2006 | |

OTHER PUBLICATIONS

Continuous Online Camber Measurement System of http://harris-instrument.com/wp-content/uploads/2016/01/HIC-Continuous-On-line-Camber-Measurement-1.pdf, created on Jun. 20, 2006.*
Model EG-30A Edge Guide Sensor, Bulletin EG30A 030928, of http://www.demas-automation.com/PRODOTTI/HARRIS/HARRIS%20Inglese/EG30A.pdf, created on Nov. 6, 2003.*
10XAS-Series Sensors for edge/centerline position & length and width measurement, Bulletin 10XAS-Series, of http://www.demas-automation.com/PRODOTTI/HARRIS/HARRIS%20Inglese/10XAS-Series.pdf, created on Aug. 28, 2003.*
Sugiyama, Masayuki et al., "A Camber-Profile Gauge Using a Laser Scanning and Light-Guide Detection Edge Sensor," Dec. 2000, Mitsubishi Electric Advance, pp. 34-37.*
Kong, NamWoong et al., "Vision-based camber measurement system in the endless hot rolling process," Oct. 2011, Optical Engineering 50(10), pp. 107202-1-107202-10.*
"Method for Camber Determination on Rolls of Thin Film," IBM Technical Disclosure Bulletin, US, vol. 34, Issue 7A, Dec. 1, 1991 (p. 400-401), (1991).

* cited by examiner

METHOD AND SYSTEM FOR OPTICAL CAMBER MEASUREMENT OF FLAT SHEET MEMBRANES, FILMS, AND WEBS

RELATED APPLICATION

This application claims the benefit of U.S. Provisional patent application No. 61/777,683 filed Mar. 12, 2013, incorporated herein by reference.

FIELD OF THE INVENTION

The present invention is directed to the optical measurement of camber in flat sheet membranes, films, and webs.

BACKGROUND OF THE INVENTION

Flat sheet membranes, films or webs can be manufactured by a variety of methods. Hereinafter, membrane, film, and web may be used interchangeably. Regardless of the method employed to manufacture a film, the final product is typically collected by winding up the film in roll form with the film wound around a central core. The roll of film can be trimmed or slit to a desired width and length. It is highly desirable that the film have a uniform width and, when unrolled, have a minimum amount of camber in order to meet camber specifications defined by the end user.

Camber refers to the curvature along the lateral edges of an elongated film. Camber inherently arises as a result of the film manufacturing process. Specifically, during manufacture (i.e., after stretching and wind-up), the produced film will have a slight thickness variation, for example, in the cross machine direction. The wound-up film will shrink on the roll after a period of time. The slight thickness variation and the shrinkage produce the undesired camber when the roll is unwound. This camber cannot be measured 'on-line' during the manufacture of the film. Camber is more evident in wider films, 4 inches or more. Camber is a quality issue in the subsequent use of the film in, for example, the manufacture of batteries, e.g., larger format batteries (those used in, for example, tablets, laptops and hybrid or electric vehicles).

Camber has been historically measured by quantifying the curvature down the lateral edge of a section of the membrane as the amount of deviation in the middle of the sample from a straight line drawn between both ends of the test sample. For example, see FIG. 1. FIG. 1 is a plan view (from above) of sample S secured (via, for example, weight W or tape, not shown) at one end of the sample S to a flat surface (or table), not shown. The sample is flattened on the surface by, for example, de-airing the space between the sample and the surface (e.g., by use of a squeegee). A straight line SL (defined, for example, by a taut string) is placed adjacent one lateral edge of the film. The length X of the sample may be arbitrarily set at any distance, but lengths of 1 or 2 meters (or longer) are common. The amount of camber is measured (for example by a steel ruler or caliper) as the amount of deviation D from the straight line SL at the mid-point C of the sample S.

This camber measurement method is a slow and labor intensive process and is subject to testing variation since human judgment of the tester is involved in the camber measurement process. Current manual camber testing methods or devices in the marketplace are typically accurate only to the nearest 0.5 mm.

A need exists for a practical camber testing method and system that can not only achieve a level of accuracy better than +/−0.5 mm, but that is economical to operate and affordable to purchase, and/or has a level of accuracy preferably to the nearest 0.3 mm, more preferably to the nearest 0.2 mm, and most preferably to the nearest 0.1 mm or better.

BRIEF SUMMARY OF THE INVENTION

A system, method, and device for measuring camber in a film is disclosed. The system generally includes: a flat surface with a longitudinal axis, at least three sensors spaced apart along the longitudinal axis, and a computing device operatively connected to each sensor. When the film is positioned in relationship to the sensors, the computing device computes the camber of the film. The flat surface may be a table with a film holder. At least one of the sensors may be a LED sensor. The computing device may have an output means, such as a monitor, a printer, or both. The computing device defines a straight line between the first and third sensor based on the position of the film, and the camber is a deviation of the film, measured by the second sensor, from the straight line.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
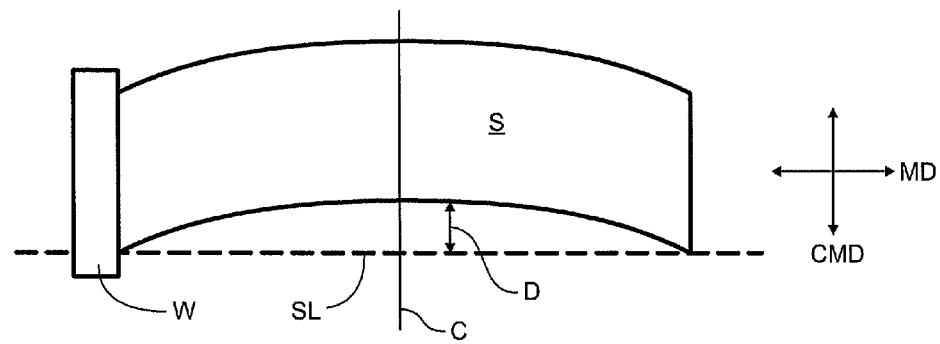
FIG. 1 is a schematic illustration of the prior art test method.
Figure 2:
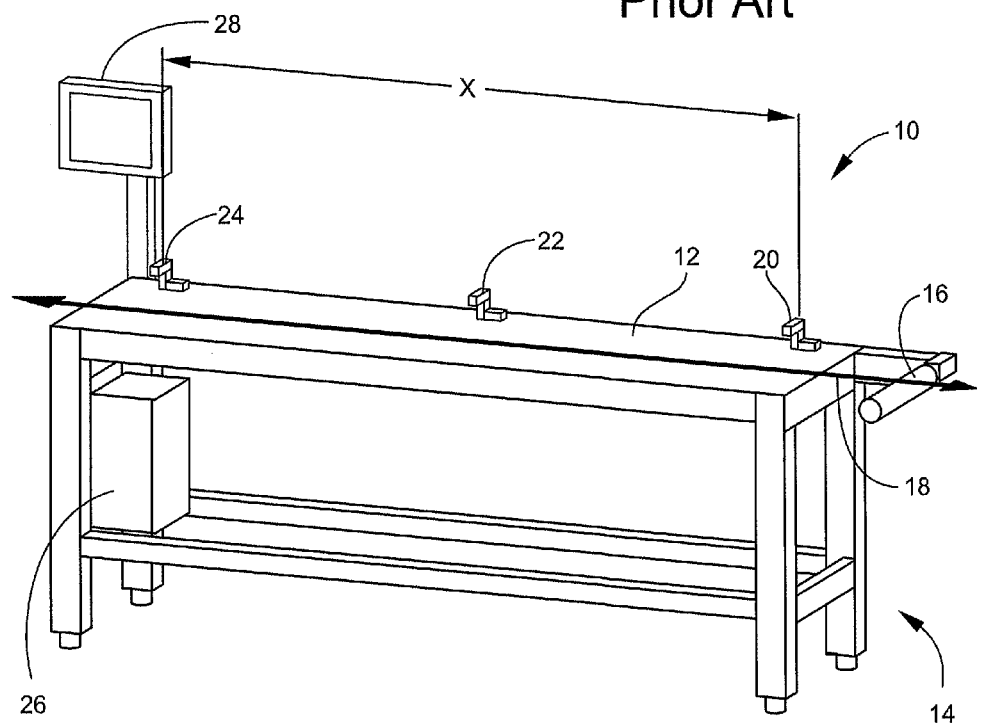
FIG. 2 is a schematic illustration of an embodiment of the invention.

Referring to the drawings wherein like element have like numerals, there is shown in FIG. 2 a system 10 for measuring camber of a film. System 10 generally comprises a flat surface 12 with a longitudinal axis 18, at least three sensors 20, 22, 24, and a computing device 26. The system 10 may quantify the amount of camber of the film to an accuracy of, in one embodiment, less than ±0.5 mm, or, in another embodiment, about ±0.3 mm, or, in yet another embodiment, about ±0.2 mm, or, in still another embodiment, about ±0.1 mm. The system may also be repeatable, so that in repeat tests of the same film, the results will be substantially the same.

Flat surface 12 may be any flat surface. The flat surface may have a surface finish such that the film may freely move thereon after flattening (discussed below). Thus, the surface finish may have a low co-efficient of friction. That finish may be obtained by highly polishing the surface with a jeweler rouge (e.g., a mirror finish). The surface may be a highly polished metal surface, for example, a highly polished, clear anodized aluminum surface. Flat surface 12, as shown, by way of non-limiting example, may be a part of a table 14. Table 14 may include a film roll holder 16 at one end of the table 14. The film being tested will be positioned on the flat surface 12 during the test procedure (discussed below).

The sensors 20, 22, and 24 are positioned on the flat surface. These sensors are for sensing the lateral edge of the film, as will be described in greater detail below. The first sensor 20 and third sensor 24 may be positioned at any distance X from one another. The distance X may be arbitrarily assigned, but, in most cases, may be 1 or 2 or 3 meters apart. The second sensor 22 is located between the first sensor 20 and the third sensor 24. For example, the second sensor may be located at the mid-point between the first and third sensors. All of the sensors are aligned in a straight line along a lateral edge portion of the flat surface 12, and are, therefore, equidistant from the longitudinal axis 18 of the flat surface 12.

Figure 3:
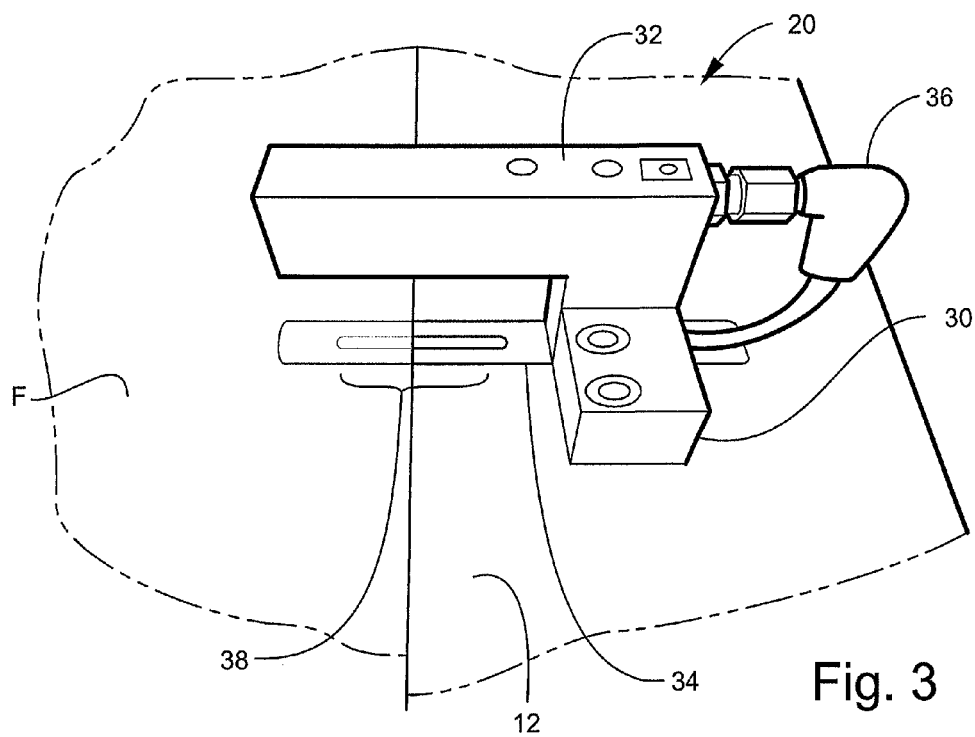
FIG. 3 is a schematic illustration of an embodiment of a sensor of the invention.

The sensors 20, 22, and 24 may be any sensor capable of determining the position of an edge of a film located within the range of the sensor. Such sensors include, by way of example, LED (light emitting diodes) sensors, scanning lasers, translating lasers, charged coupled device (CCD) cameras, and high definition video. In one embodiment, the sensor may be a LED sensor, BALLUFF BGL 30C or 50C from Scott Equipment Company of Charlotte, N.C. (having a maximum resolution of 0.08 mm). For example, see FIG. 3. In FIG. 3, one sensor 20 is shown in greater detail. In this embodiment, the sensor is a LED sensor. Sensor 20 generally includes a mount 30, an upper portion 32, a lower portion 34, and a communication conduit 36. The lower portion 34 is aligned (or flush) with the flat surface 12, while the upper portion 32 is positioned above (or space apart therefrom) the flat surface 12, so that a film F may be passed between the upper portion 32 and lower portion 34. The upper portion 32 may be a light sensor and lower portion 34 may be a light emitter (of course, these functions may be reversed). The upper and lower portions define a sensor range 38, for example, each portion is defined by an array (or a line) of light emitters and sensors aligned above and below one another. Communications conduit 36 operatively connects the sensor to the computing device 26.

Computing device 26 may be any computer-like device capable of translating information received from the sensors 20, 22, and 24 about the position of the lateral edge of the film, defining a straight line between the actual lateral edge of the film at the first sensor 20 and the third sensor 24, and calculating the camber of the film by calculating the deviation of the actual lateral edge of the film F located at the second sensor 22 from the calculated (or theoretical) straight line. Since the camber measurement is taken at the middle of the sample length, the system 10 reports the difference between the actual position of the lateral edge of the film at the mid-point of the sample and the theoretical line projected from the actual position of the film determined by the first and second sensors. Additionally, the computing device 26 may include an output means 28. The output means may be a display, a printer, or both.

Figure 4:
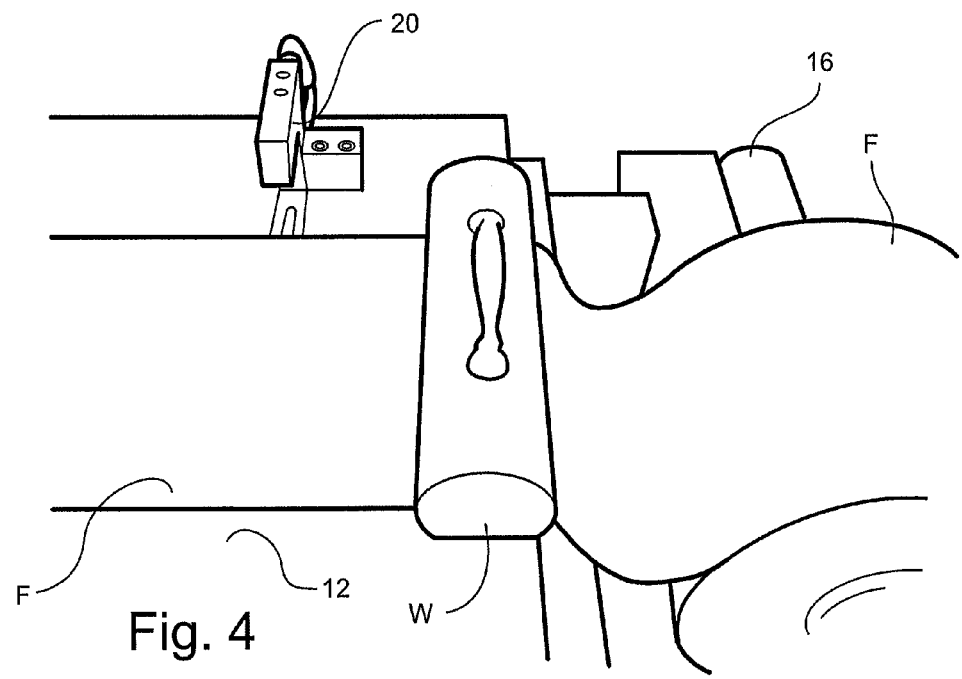
FIG. 4 is a schematic illustration of the set up of the system with the film being positioned on the flat surface adjacent one of the sensors.
Figure 5:
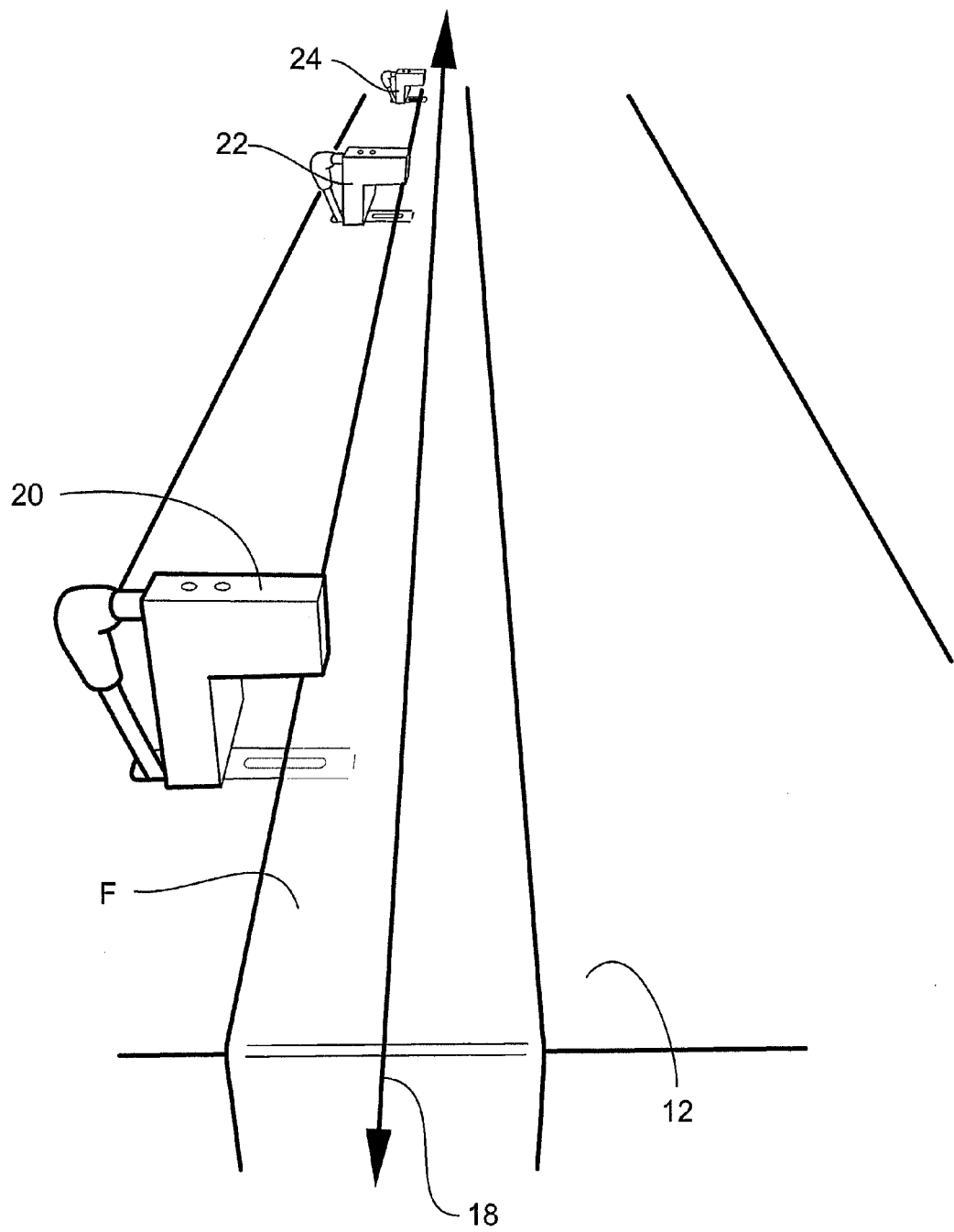
FIG. 5 is a schematic illustration of the film positioned on the flat surface.

The operation of system 10 is illustrated by reference to FIGS. 4 and 5. In FIG. 4, a roll of film F may be mounted on the film roll holder 16 of table 14 (the film holder is optional, a length of film may be used instead of the roll of film). In FIG. 5, the film F is stretched out along the longitudinal axis 18 of the flat surface 12. During testing, the sample may be tested 'off-line' (i.e., not during manufacture); the sample may be stationary (i.e., not moving); and the sample may be flattened. The test may be run on the film after wind-up and after a period of time (e.g., at least 2 hours, or in the range of 2-24 hours), so that any shrinkage of the film will have stabilized. The test cannot be run 'on-line' (i.e., during manufacture of the film). One lateral edge of the film F is positioned adjacent sensors 20, 22, 24. In this embodiment, 'adjacent to the sensors' means that the lateral edge of the film F is positioned between the upper portion 32 and the lower portion 34 of the each sensors and within the sensor range 38 of each sensor. A weight W, seen in FIG. 4, is placed on one end of the film F, all other edges (i.e., the two lateral edges and the free end of the film) are free to fall in their natural position on the flat surface 12. The space between the film F and the flat surface 12 is de-aired, for example by a squeegee, so that the film falls onto the flat surface without wrinkles or creases in the film. By so doing, the camber of the film F may be visible. Again, the lateral edge of the film F should be within the sensor range 38 of each sensor. Now, the actual position of the lateral edges of the film is determined at the first and third sensors (this determination is made by the computing device 26 with information from the first and third sensors). The computing device 26 calculates a theoretical straight line (the theoretical straight lateral edge of film without camber) between the actual position of the lateral edge of the film between the first and third sensors. The computing device then determines the actual position of the lateral edge of the film at the position of the second sensor. The camber is determined by the difference (or deviation) of the actual position of the lateral edge at the second sensor from the theoretical line between the actual positions of the lateral edge located at the first and third sensors. The computing device outputs the camber measurement to its output means.

EXAMPLE

In order to demonstrate the improvement in accuracy using the inventive system and method as compared to the prior art method, a Gage Repeatability and Reproducibility (R&R) study was performed using 10 samples of flat sheet Celgard® brand microporous battery separator membrane. The test samples had varying levels of camber. Test results comparing the prior manual camber test method (described in the Background section of this application) and the inventive method are shown in the Table 1 below. The Total Gage R&R % Contribution listed in column 3, consists of "Repeatability" which is defined as the variability from repeated measurements by the same operator and "Reproducibility" which is the variability when the same part is measured by different operators. The R&R study included a total of three test operators.

TABLE 1

| Testing Machine | Testers/ Operators | Total Gage R&R % Contribution | % Study Variation | Distinct Categories |
|---|---|---|---|---|
| Inventive system | Operator 1, 2 and 3 | 3.19 | 17.85 | 7 |
| Inventive system | Operator 1 and 2 | 1.99 | 14.12 | 9 |
| Prior Art method | Operator 1 and 2 | 12.28 | 35.04 | 3 |

The 'Percent (%) Study Variation' compares the measurement system variation to the total variation. A lower value of '% Study Variation' is preferred. The 'Number of Distinct Categories' value estimates how many separate groups of parts the system can distinguish. A higher value in the 'Number of Distinct Categories' is preferred.

TABLE 2

General Acceptance Criteria for Gage R + R Performance

|  | % Contribution | % Study Variation | Distinct Categories |
|---|---|---|---|
| Good | <5% | <10% | ≥5 |
| Marginal | 5% to 15% | 10% to 30% | 2-4 |
| Reject | >15% | >30% | <2 |

The test results in Table 2 show that for all three Gage R&R metrics, the performance for the inventive OCM device was significantly better than for the prior art manual camber test method.

The inventive system and method has improved the resolution of the camber measurement from +/−0.5 mm, typical of prior art systems, to +/−0.1 mm which is an 80% improvement in the accuracy of the camber measurement.

The present invention may be embodied in other forms without departing from the spirit and the essential attributes thereof, and, accordingly, reference should be made to the appended claims, rather than to the foregoing specification, as indicated the scope of the invention.

We claim:

1. A system for measuring camber in a stationary film comprising:
    a flat surface with a longitudinal axis, said flat surface is part of a table, said table has a film roll holder, the stationary film lays flat on said flat surface,
    at least three stationary sensors spaced apart along said longitudinal axis, each of said sensors includes a light emitting diode (LED) sensor, a scanning laser, a translating laser, a charged coupled device (CCD) camera, or a high definition video camera, the first and third sensors being at least one meter apart, and
    a computing device operatively connected to each said sensor, whereby when the stationary film is positioned in relationship to said sensors, said computing device computes the camber of the stationary film by defining a straight line between the first and third sensor at an actual lateral edge of the stationary film, measuring the actual edge of the stationary film by the second sensor between the first and third sensors, and the camber is a deviation of the measurement from the second sensor measurement and the straight line, the computed camber is accurate to less than ±0.5 mm.

2. The system of claim 1 wherein at least one of the sensors is a LED sensor.

3. The system of claim 1 wherein each said sensor is a LED sensor.

4. The system of claim 1 wherein said computing device has an output means.

5. The system of claim 4 wherein said output means is a monitor, a printer, or both.

6. A method for measuring camber in a stationary film comprising the steps of:
    positioning a stationary film having a lateral edge on a flat surface adjacent at least three stationary sensors, each of said sensors includes a light emitting diode (LED) sensor, a scanning laser, a translating laser, a charged coupled device (CCD) camera, or a high definition video camera, the first and third sensors being at least one meter apart, said flat surface is part of a table, said table has a film roll holder, the stationary film lays flat on said flat surface,
    determining a straight line between an actual edge position of the lateral edge of the stationary film at a position of the film at the first and third sensor,
    determining an actual edge position of the lateral edge of the stationary film at the second sensor, and
    calculating a deviation of the actual edge position of the film at the second sensor from the straight line, the deviation is the camber, the calculated camber is accurate to less than ±0.5 mm.

7. A device measuring camber in a stationary film comprising:
    a flat surface with a longitudinal axis, said flat surface is part of a table, said table has a film roll holder, the stationary film lays flat on said flat surface,
    at least three stationary sensors spaced apart along said longitudinal axis, each of said sensors includes a light emitting diode (LED) sensor, a scanning laser, a translating laser, a charged coupled device (CCD) camera, or a high definition video camera, the first and third sensors being at least one meter apart, and
    a computing device operatively connected to each said sensor, whereby when the stationary film is positioned in relationship to said sensors, said computing device computes the camber of the stationary film by defining a straight line between the first and third sensor at an actual lateral edge of the stationary film, measuring the actual edge of the stationary film by the second sensor between the first and third sensors, and the camber is a deviation of the measurement from the second sensor measurement and the straight line, the computed camber is accurate to less than ±0.5 mm, the stationary film is a membrane, film, or web.

8. The device of claim 7 wherein at least one of the sensors is a LED sensor.

9. The device of claim 7 wherein each said sensor is a LED sensor.

10. The device of claim 7 wherein said computing device has an output means.

11. The device of claim 10 wherein said output means is a monitor, a printer, or both.

* * * * *

UNITED STATES PATENT AND TRADEMARK OFFICE
CERTIFICATE OF CORRECTION

PATENT NO. : 9,541,384 B2
APPLICATION NO. : 14/205849
DATED : January 17, 2017
INVENTOR(S) : Bogyeol Harn, David P. Bourcier and Alan H. Freeman It is certified that error appears in the above-identified patent and that said Letters Patent is hereby corrected as shown below:

On the Title Page

Under Item (12), and in Item (72) Inventors: last name of First Inventor should be replaced with "Harn" instead of "Ham."

Signed and Sealed this
Eleventh Day of April, 2017

Michelle K. Lee
*Director of the United States Patent and Trademark Office*